A. E. Baldwin
Milk Cooler.

No. 93,583.　　　　　　　　Patented Aug. 10, 1869.

Witnesses.
Henry J Artz

Inventor
Anna E. Baldwin
by Alex. A. C. Llaucke & Co
Attorneys.

UNITED STATES PATENT OFFICE.

ANNA E. BALDWIN, OF NEWARK, NEW JERSEY.

IMPROVEMENT IN MILK-COOLERS.

Specification forming part of Letters Patent No. 93,583, dated August 10, 1869.

*To all whom it may concern:*

Be it known that I, ANNA E. BALDWIN, of Newark, in the county of Essex and State of New Jersey, have invented a new and useful Improvement in Milk-Coolers; and I do hereby declare the following to be a full and correct description of the same, sufficient to enable others skilled in the class to which my invention appertains to fully understand and use the same, reference being had to the accompanying drawings, which make part of this specification, and in which—

Figure 1:
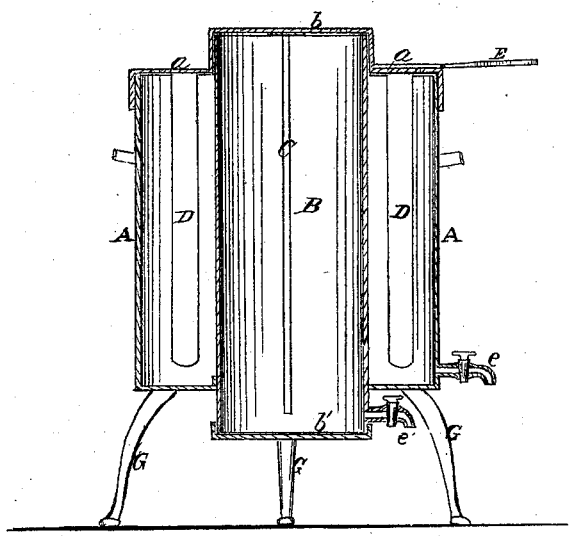
Figure 2:
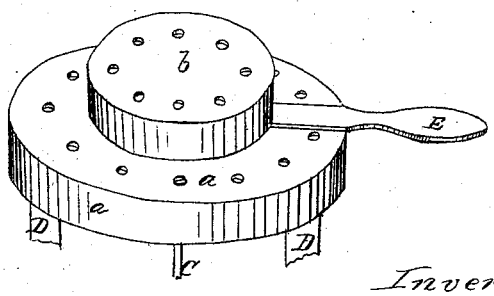

Figure 1 is a central vertical section of my improved milk-cooler, and Fig. 2 is a detached perspective view of its lid.

Like letters of reference indicate like parts in both figures.

My invention consists in the construction of an apparatus for cooling milk, so constructed that the latter may be from time to time gently stirred, so that every particle of it becomes exposed to the cooling-surface.

A in the drawings represents a vessel of any convenient size, through which a tube, B, passes centrally, extending beyond the vessel A above and below. This tube is closed at the bottom by a cover, $b'$, which may be screwed on or otherwise secured. Its top is closed by a perforated lid, $b$, formed on and in one piece with the perforated lid $a$ of vessel A.

To the under side of lid $b$ is secured centrally a paddle or stirrer, C, and to the under side of lid $a$ two or more paddles or stirrers, D, which paddles C D extend downwardly to near the bottom of their respective vessels.

On lid $a$ is secured a handle, E, by means of which the lid $a$ $b$ may be turned in either direction.

The vessel A and the tube B are each provided with a faucet, $e$ $e'$, through which the milk and water may be drawn off. The vessel A may be placed on legs G, or on a bench provided with a hole to allow tube B to protrude through.

Cold water or ice is placed in the tube B and the vessel A filled with milk. The lid $a$ $b$, being placed in position, is occasionally turned in either direction, the paddles C D gently stirring the water or ice and the milk, thus bringing every particle of cold water or ice into contact with the walls of the tube, and exposing every particle of the milk to its cold surface. The perforations of lid $a$ $b$ allow the heat or warmth to escape.

Having thus described my invention, what I claim as new, and desire to secure by Letters Patent, is—

The milk-cooling apparatus consisting of vessel A, tube B, lid $a$ $b$, when provided with paddles C D and handle E, and faucets $e$ $e'$, substantially as and for the purposes described.

ANNA E. BALDWIN.

Witnesses:
SOPHIA B. COREY,
JAMES F. BOND.